United States Patent
Stone et al.

(10) Patent No.: US 8,620,527 B2
(45) Date of Patent: Dec. 31, 2013

(54) SYSTEMS AND METHODS FOR STEERING AND CALIBRATION OF VEHICLE STEERING CONTROLS FOR RIDING MOWERS AND OTHER VEHICLES

(71) Applicant: Accelerated Systems Inc., Kitchener (CA)

(72) Inventors: Terence Wade Stone, Kitchener (CA); Robert Gordon Lankin, St. Agatha (CA)

(73) Assignee: Acellerated Systems Inc., Waterloo, Ontario (CA)

(*) Notice: Subject to any disclaimer, the term of this patent is extended or adjusted under 35 U.S.C. 154(b) by 0 days.

(21) Appl. No.: 13/657,235

(22) Filed: Oct. 22, 2012

(65) Prior Publication Data
US 2013/0110351 A1     May 2, 2013

Related U.S. Application Data

(60) Provisional application No. 61/551,888, filed on Oct. 26, 2011.

(51) Int. Cl.
*B62D 12/00*     (2006.01)
(52) U.S. Cl.
USPC ............. 701/41; 701/39; 701/42; 701/43; 701/89; 180/65.21; 180/197; 180/311; 180/411; 180/417; 83/348; 83/698.41; 493/83; 493/342; 493/365; 340/309.4; 340/691.3; 417/210; 417/220; 403/321
(58) Field of Classification Search
USPC ................ 701/39, 41, 42, 43, 89, 31.1, 31.3; 180/65.21, 197, 311, 411, 417; 83/348, 83/698.41; 493/83, 342, 365; 340/309.4, 340/691.3; 403/321
See application file for complete search history.

(56) References Cited

U.S. PATENT DOCUMENTS

| | | | | |
|---|---|---|---|---|
| 4,070,671 | A * | 1/1978 | Morrow | 367/6 |
| 4,807,904 | A * | 2/1989 | Kamlukin et al. | 280/781 |
| 4,865,146 | A * | 9/1989 | Ohe | 180/413 |
| 4,886,291 | A * | 12/1989 | Okamoto | 280/5.501 |
| 5,032,996 | A * | 7/1991 | Shiraishi | 701/41 |
| 5,099,714 | A | 3/1992 | Hutchison et al. | |
| 5,194,851 | A * | 3/1993 | Kraning et al. | 340/438 |
| 5,218,366 | A * | 6/1993 | Cardamone et al. | 342/385 |
| 5,282,135 | A * | 1/1994 | Sato et al. | 701/43 |
| 5,283,740 | A * | 2/1994 | Sato et al. | 701/43 |
| 5,348,502 | A * | 9/1994 | Wigram | 441/7 |
| 5,667,032 | A | 9/1997 | Kamlukin | |
| 5,691,957 | A * | 11/1997 | Spiesberger | 367/3 |
| 5,988,936 | A * | 11/1999 | Smith | 404/84.2 |

(Continued)

*Primary Examiner* — McDieunel Marc
(74) *Attorney, Agent, or Firm* — Bereskin & Parr LLP

(57) ABSTRACT

According to one aspect, a vehicle control system. The control system includes a steering control coupled to at least one steerable wheel, the steering control having a first position, a second position and a plurality of positions therebetween. The control system also includes a steering sensor coupled to the steering control and configured to generate steering sensor signals based upon the position of the steering control. The control system also includes a control module coupled to the steering sensor, the control module configured to (i) record a first steering sensor signal value when the steering control is in the first position; (ii) record a second steering sensor signal value when the steering control is in the second position; and (iii) determine a current position of the steering control by comparing the first and second steering sensor signal values with a current steering sensor signal value.

22 Claims, 5 Drawing Sheets

(56) References Cited

U.S. PATENT DOCUMENTS

| | | | | |
|---|---|---|---|---|
| 6,548,969 | B2 * | 4/2003 | Ewbank et al. | 318/34 |
| 6,691,009 | B1 * | 2/2004 | Yao et al. | 701/41 |
| 6,694,239 | B1 * | 2/2004 | Yao et al. | 701/41 |
| 6,721,639 | B2 * | 4/2004 | Raypole et al. | 701/30.8 |
| 6,736,604 | B2 * | 5/2004 | Okada et al. | 417/213 |
| 6,948,299 | B2 * | 9/2005 | Osborne | 56/10.8 |
| 7,075,458 | B2 * | 7/2006 | Dowdy | 340/984 |
| 7,114,589 | B2 * | 10/2006 | Kowatari et al. | 180/243 |
| 7,192,040 | B2 * | 3/2007 | Xie | 280/93.502 |
| 7,222,008 | B2 * | 5/2007 | Takahashi et al. | 701/41 |
| 7,237,639 | B2 * | 7/2007 | Kowatari et al. | 180/243 |
| 7,295,907 | B2 * | 11/2007 | Lu et al. | 701/41 |
| 7,311,184 | B2 * | 12/2007 | Patridge | 192/16 |
| 7,487,856 | B2 * | 2/2009 | Edson et al. | 180/421 |
| 7,549,243 | B1 * | 6/2009 | Gilles | 37/468 |
| 7,756,621 | B2 * | 7/2010 | Pillar et al. | 701/41 |
| 7,800,359 | B2 * | 9/2010 | Goto et al. | 324/207.25 |
| 7,866,432 | B2 * | 1/2011 | Xie | 180/252 |
| 8,287,323 | B2 * | 10/2012 | Hine et al. | 440/9 |
| 8,376,790 | B2 * | 2/2013 | Hine et al. | 440/9 |
| 2008/0278314 | A1 * | 11/2008 | Miller et al. | 340/539.13 |
| 2010/0045506 | A1 * | 2/2010 | Law et al. | 342/13 |

\* cited by examiner

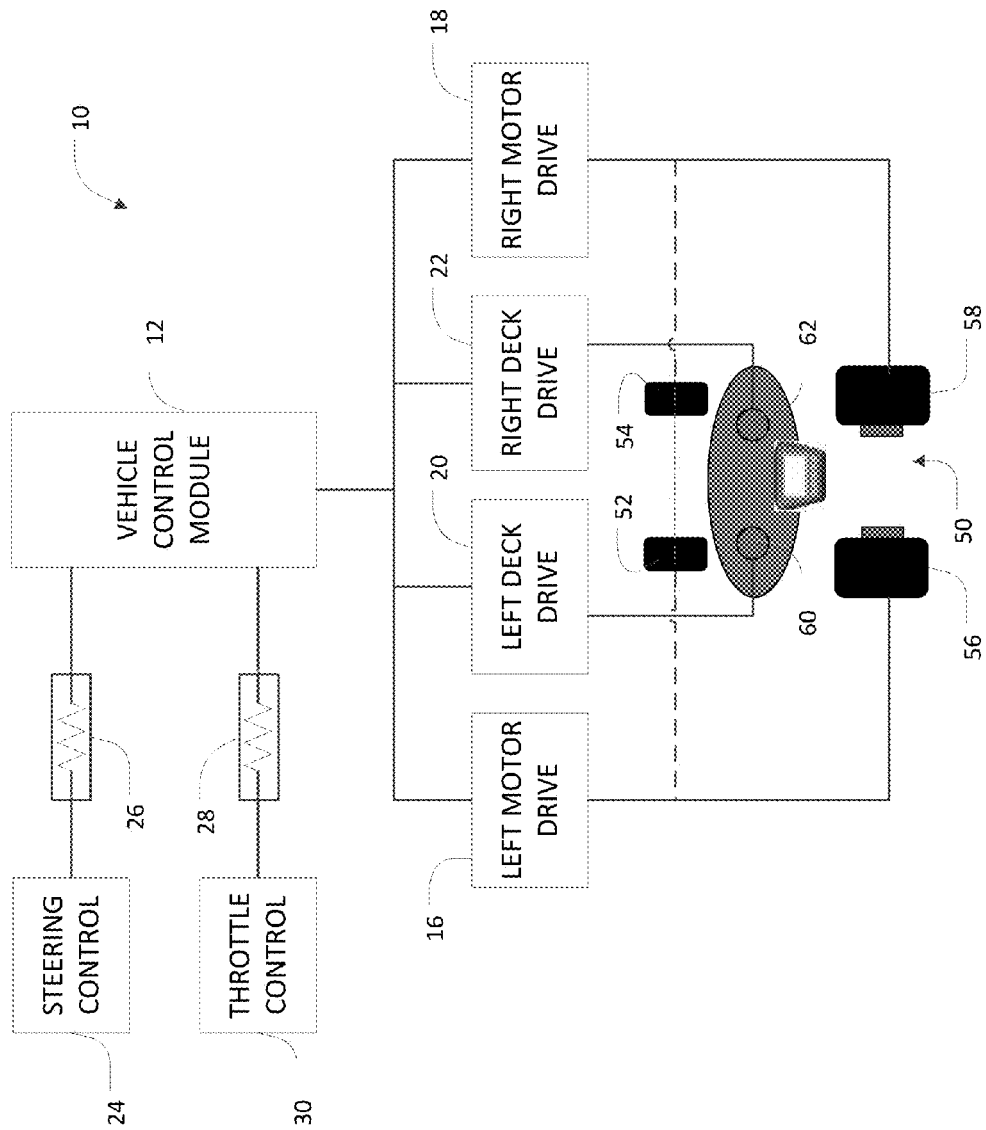

SYSTEMS AND METHODS FOR STEERING AND CALIBRATION OF VEHICLE STEERING CONTROLS FOR RIDING MOWERS AND OTHER VEHICLES

RELATED APPLICATIONS

This application claims the benefit of U.S. Provisional Patent Application Ser. No. 61/551,888, filed Oct. 26, 2011, the entire contents of which are hereby incorporated by reference herein for all purposes.

TECHNICAL FIELD

The embodiments herein relate to vehicle control systems, and in particular to systems and methods for steering and calibration of vehicle steering controls for electric riding lawn mowers and other vehicles.

BACKGROUND

Riding lawn mowers, riding snow blowers, riding lawn tractors, electric scooters and other similar vehicles often operate on various types of ground surfaces with many different obstacles.

For example, riding lawn mowers are often used to cut grass or turf in areas with trees, rocks, shrubs and other obstacles that interfere with the path of the mower. Accordingly, such vehicles include steering controls for controlling the direction of travel of the vehicle and throttle controls for controlling the vehicle speed.

In some cases, the steering controls may be mechanically coupled to one or more steerable wheels. For example, the front wheels or rear wheels (or both) may be coupled to a steering control system that includes a steering wheel. An operator can turn the steering wheel to steer the mower. Riding lawn mowers also include a throttle control (e.g. a foot pedal or hand control) for controlling speed. The positions of the steering control and throttle control are often measured by sensors (e.g. electromechanical sensors), and the measured positions may be used to adjust the vehicle speed, the direction of travel, and so on.

One challenge with riding lawn mowers is calibrating these sensors, particularly since riding mowers are often used in tight confines where vehicle control is important. Specifically, variations in sensor accuracy may translate into different sensor readings between vehicles for the same relative throttle control and steering control positions. This is generally undesirable, as it creates a non-uniform response to the same control input across different vehicles.

Calibrating the vehicle control systems to compensate for sensor inaccuracies during manufacturing can be quite challenging and time consuming. Moreover, when performing a repair and changing a sensor in the field (e.g. at a repair shop), the new sensor may provide different readings and can lead to an unpredictable response for that vehicle's driver. This may undermine confidence in the quality of the vehicle and in the repair.

SUMMARY OF SOME EMBODIMENTS

According to some aspects, a vehicle control system. The control system includes a steering control coupled to at least one steerable wheel, the steering control having a first position, a second position and a plurality of positions therebetween. The control system also includes a steering sensor coupled to the steering control and configured to generate steering sensor signals based upon the position of the steering control. The control system also includes a control module coupled to the steering sensor, the control module configured to (i) record a first steering sensor signal value when the steering control is in the first position; (ii) record a second steering sensor signal value when the steering control is in the second position; and (iii) determine a current position of the steering control by comparing the first and second steering sensor signal values with a current steering sensor signal value.

According to some other aspects, a vehicle control method. The method includes recording a first steering sensor signal value when a steering control is in a first position, recording a second steering sensor signal value when the steering control is in a second position, and determining a current position of the steering control by comparing the first and second steering sensor signal values with a current steering sensor signal value.

Other aspects and features will become apparent, to those ordinarily skilled in the art, upon review of the following description of some exemplary embodiments.

BRIEF DESCRIPTION OF THE DRAWINGS

Various embodiments will now be described, by way of example only, with reference to the following drawings, in which FIG. 1 is a schematic diagram illustrating a control system for an electric riding mower or other similar vehicle according to some embodiments;

DETAILED DESCRIPTION OF SOME EMBODIMENTS

Figure 2A:
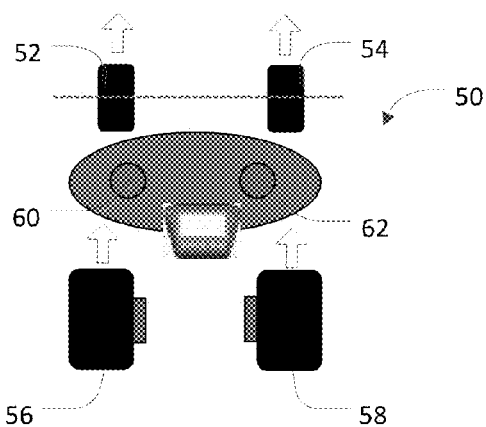
FIGS. 2A-2E are a schematic diagrams illustrating different wheel orientations of the vehicle shown in FIG. 1.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of those embodiments as described.

Referring now to FIG. 1, illustrated therein is a control system 10 for an electric riding mower or other vehicle according to some embodiments. The control system 10 is generally adapted to control at least one of the direction and speed of the riding mower. In some embodiments, the vehicle may be a "zero turning radius" vehicle, such as a riding lawn mower with a turning radius of substantially zero inches.

The control system 10 will be described with reference to vehicle 50 shown in FIGS. 1 and 2, which is a riding lawn mower having four wheels: front wheels 52, 54 and rear wheels 56 and 58.

In this embodiment, the front left wheel 52 and the front right wheel 54 are steerable wheels, in that their orientation relative to the vehicle 50 may be pivoted to turn the vehicle 50, while the rear wheels 56 and 58 are not steerable wheels. In other embodiments, other combinations of the wheels 52, 54, 56, 58 could be steerable (for example all four wheels 52, 54, 56, 58 could be steerable, or only the rear wheels 56, 58 could be steerable).

The vehicle 50 as shown also has two mowing decks, namely a left mowing deck 60 and a right mowing deck 62. Each mowing deck 60, 62 includes one or more cutting blades disposed on an underside of the vehicle 50 for cutting vegetation (e.g. grass, weeds, etc.). In other embodiments, the number of mowing decks may differ, for example the vehicle 50 may only have one mowing deck.

The system 10 also includes a vehicle control module 12. The vehicle control module 12 is generally adapted to control movement of the vehicle 50 and operation of the decks 60, 62. The vehicle control module 12 may include one or more processors and data storage devices (e.g. memory) coupled thereto which can store instructions for operating the vehicle 50 and other information (e.g. stored sensor information). In particular, the vehicle control module 12 is operably coupled to a plurality of sensors as discussed below that can provide information about the desired vehicle speed and direction.

The vehicle control module 12 is also operatively coupled to at least one motor drive that drives one or more of the wheels 52, 54, 56, 58 to move the vehicle 50. In particular, in this embodiment the vehicle control system 12 is coupled to a left motor drive 16 and a right motor drive 18 that drive the left rear wheel 56 and right rear wheel 58, respectively. In other embodiments, other combinations of wheels 52, 54, 56, 58 could be driven (for example all four wheels 52, 54, 56, 58 could be driven, or only the front wheels 52, 54 could be driven).

The vehicle control module 12 is also operatively coupled to a left deck drive 20 and a right deck drive 22 that drive the left mowing deck 60 and right mowing deck 62, respectively.

As introduced above, the vehicle 50 may include a plurality of sensors that provide information about the desired vehicle speed and direction. The sensors in this embodiment include a steering sensor 26 and a throttle sensor 28

The steering sensor 26 is coupled to and monitors the movement of a steering control 24. The steering control 24 could include a steering wheel mechanically coupled to the steerable wheels 52, 54 (e.g. using a rack and pinion system) or be electrically or otherwise coupled thereto so that the wheels 52, 54 can be steered independently of each other.

Figures 2B, 2C:
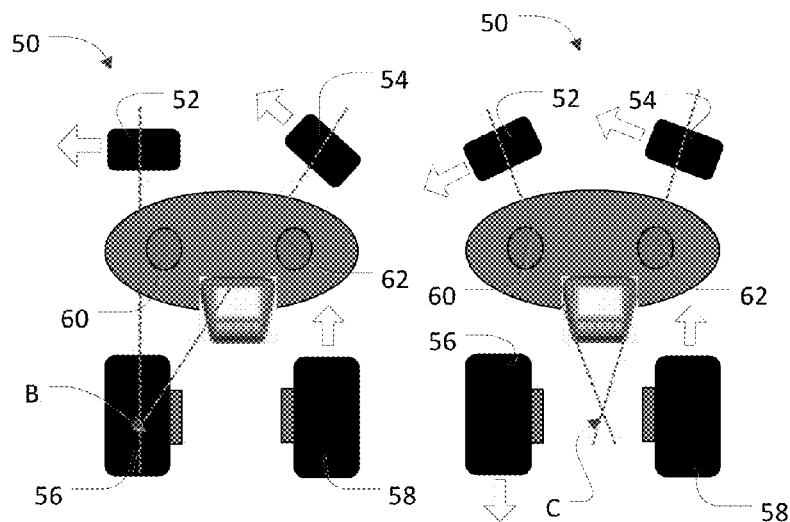
Figures 2D, 2E:
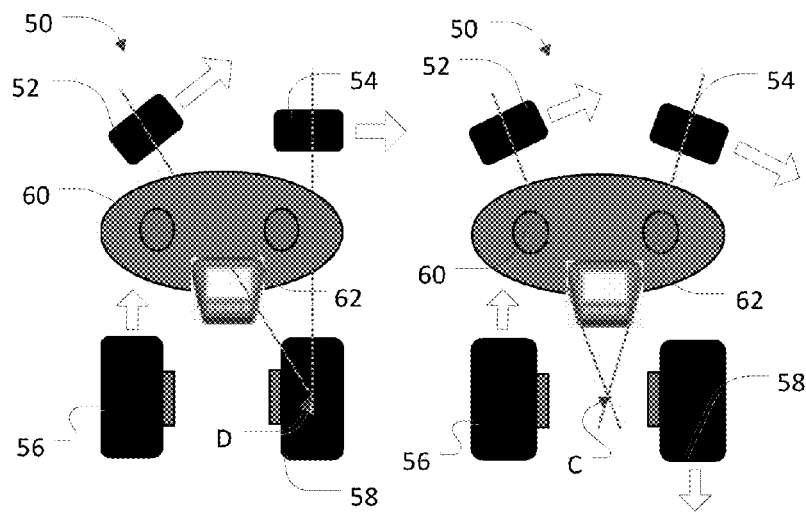

The steering control 24 is generally operable to turn the steerable wheels 52, 54 into a desired position. For example, the steerable wheels 52, 54 may be turned between a first position (e.g. a "zero turn left" as shown in FIG. 2C where the vehicle 50 turns about point C), a. second position (e.g. a "zero turn right" position as shown in FIG. 2E where the vehicle 50 turns about point C), and a plurality of positions therebetween (including a "straight" position shown in FIG. 2A, a pivot left position shown in FIG. 2B where the vehicle 50 turns about point B, and a pivot right position shown in FIG. 2D where the vehicle 50 turns about point D).

Generally, the positions of the steerable wheels 52, 54 can be determined from the current position of the steering control 24. That is, the position of the steering control 24 is normally directly related to the position of the wheels 52, 54.

Accordingly, the steering sensor 26 may be used to determine the angle of the wheels 52, 54 by measuring the position of the steering control 24.

In some embodiments, the steering sensor 26 may be an electro-mechanical sensor that generates a steering voltage value (or other signal) based upon the position of the steering control 24 (e.g. by measuring a rotational angle of a steering shaft, for example). For instance, the sensor 26 may generate a first voltage $V_R$ when the steering wheel is in the zero turn right position and a second voltage $V_L$ when the steering control 24 is the zero turn left position. The sensor 26 also generates a voltage $V_x$ (normally between $V_R$ and $V_L$) when the steering control 24 is at some position X between the zero turn left and zero turn right positions (e.g. ($V_L<V_x<V_R$) or ($V_R<V_x<V_L$)). In other embodiments, the steering sensor 26 may be an optical sensor or other suitable sensor, and may output a corresponding sensor signal.

The system 10 also includes a throttle sensor 28 coupled to a throttle control 30. The throttle control 30 is adapted to receive driver input indicative of the desired speed of the vehicle 50. That is, the driver may use the throttle control 30 to control the speed. In some embodiments, the throttle control 30 could be a foot pedal, a hand controller, an electronic controller, or another suitable actuator.

The throttle control 30 may operate in a full forward position, a full reverse position, and a plurality of positions therebetween (including a neutral position). Generally, when the throttle control 30 is in the full forward position, it is indicative that the vehicle 50 should be moved forward at or near a forward top speed. However, this does not necessarily involve sending a maximum amount of power to all the driving wheels 56, 58, or even the same amount of power to both wheels 56, 58 as will be discussed further below.

Similarly, when the throttle control 30 is in the full reverse position, it generally means that the vehicle should be reversing at or near a reverse top speed, which may be different from the forward top speed (and which in particular may be less than the forward top speed).

In contrast, when the throttle is in the neutral position, it generally means that the driving wheels 56, 58 should not be driven.

In the embodiments as shown, the motor drives 16, 18 are electric motors powered by one or more electrical power sources, such as a battery. In some other embodiments, another power source (e.g. a fuel cell, an internal combustion engine, etc.) may be used to power the motor drives 16, 18 or otherwise drive the wheels.

In other embodiments, the wheels 52, 54, 56, 58 may be driven by a different number of motors in a different configuration. For example, each of the wheels 52, 54, 56, 58 can be driven independently using four separate motor drives.

Each motor drive 16, 18 receives control instructions from the vehicle control module 12 about how fast each of the driving wheels 56, 58 should be driven (also called a "speed setpoint" for each wheel). The speed setpoint of each driving wheel 56, 58 will depend on the position of the throttle control 30 and also on the position of the steering control 24.

In particular, the speed of each of the driving wheels 56, 58 may differ based on the direction of travel and speed of the vehicle 50. That is, the control module 12 may operate each driving wheel independently based on the desired speed and turning direction of the vehicle 50. In particular, during a turn, the outside wheels may be driven at a faster speed than the inside wheels to inhibit skidding. In some embodiments, the direction of rotation of one or more inner wheels may be reversed during a sharp turn to assist with tightening the turning radius.

For example, when the vehicle 50 is turning right, a higher speed set point will be provided to the rear left driving wheel 56 (the outside wheel) than is provided to the rear right driving wheel 58 (the inside wheel). Moreover, when the vehicle 50 is turning at a sufficiently high turn angle, the direction of rotation of the (inside) rear right driving wheel 58 may be reversed to facilitate making a tighter turn (as shown for example in FIG. 2E).

Figure 3:
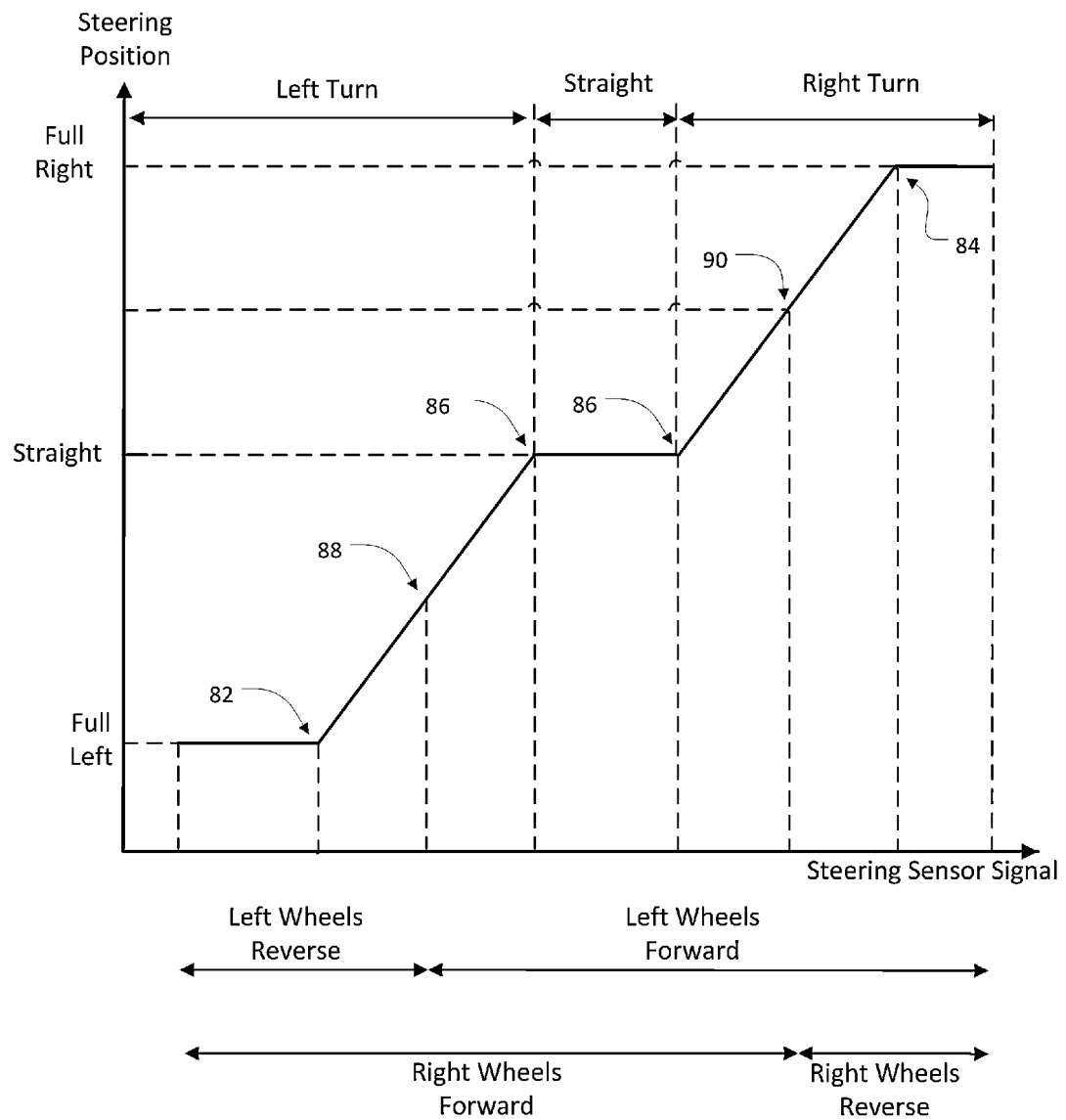
FIG. 3 is a graph illustrating the operation of the wheels of the mower of FIG. 1 based upon the position of the steering control.

Referring now to FIG. 3, illustrated there in is a graph showing the operation of left and right motor drives 16, 18 and respective left and right driving wheels 56, 58 relative to the position of the steering control 24 according to some embodiments.

The interpreted position of the steering control 24 is plotted on the vertical axis (i.e. y-axis), while the x-axis corresponds to the steering sensor signal. In particular, as shown the steering control 24 could be in the zero turn left position 82, a zero turn right position 84 and a plurality of positions therebetween, including a straight position 86, a pivot left turn position 88 and a pivot right turn position 90.

The corresponding operation of the left side wheels 52, 56 and right side wheels 54, 58 is listed below the x-axis.

During a left turn, as shown the left motor drive 16 operates in a forward mode (i.e. causing forward rotation of the left rear wheel 56) at some speed when the steering control position is between the straight position 86 and the pivot left turn position 88. Generally, as the angle of the left turn increases, the speed setpoint of the left rear wheel 56 will be decreased.

Eventually, as the left turn angle reaches the pivot left turn position 88, the left motor drive 16 will stop (as also shown in FIG. 2B). As the left turn angle increases, the left motor drive 16 will then be operated in a reverse mode (i.e. causing rearward rotation of the left rear wheel 56) when the steering position is between the pivot left turn 88 and the zero turn left position 82 (and in the zero turn left position as shown in FIG. 2C the left rear wheel 56 is in a full reverse).

While the left motor drive 16 switches between the forward and reverse modes during the left turn, the right motor drive 18 continues to operate in the forward direction (normally at a constant relationship relative to the throttle position) during the entire left turn.

Similarly, during a right turn, the right motor drive 18 works in the forward mode when the position of the steering control 24 is between the straight position 86 and the pivot right turn position 90, generally slowing as the pivot right turn position 90 is approached. As the right turn angle continues to increase, the right motor drive 18 will stop (as shown in FIG. 2D) and then eventually switch to operate in the reverse mode between the pivot right turn position 90 and the zero turn right position 84 (and in the zero turn right position 84 the right wheel 58 will be in a full reverse).

As with the left hand turn, while the right motor drive 18 switches between the forward and reverse modes during the right turn, the left motor drive 16 continue to operate in the forward direction, generally at a constant relationship relative to the throttle position.

In some embodiments, it is desirable that the left and right motor drives 16, 18 are "four quadrant" drives that are able to accelerate and brake (regeneratively) in both the forward and reverse directions. In this manner, the motor drives 16, 18 will be able to maintain the wheels 56, 58 at the setpoint speeds regardless of the direction of rotation of the wheels 56, 58.

The use of four quadrant regenerative drives that provide regenerative braking may provide one or more benefits. For instance, four quadrant drives may provide braking action that is very responsive, which may allow the vehicle 50 to be stopped very quickly. Furthermore, regenerative braking will tend to improve the energy efficiency of the vehicle 50, since the braking energy will be recuperated and returned to the batteries.

Moreover, the use of regenerative braking gives the vehicle 50 a "stiffness" or feel which is similar to a hydrostatic drive, which may be helpful to give a drive feel that is familiar to users of hydrostatic equipment. However, in hydrostatic systems, this stiffness is due to system inefficiency, whereas in the present vehicles 50 the stiffness is due to regenerative braking action.

As described above, the adjustments to the operational speeds of the left and right motor drives 16, 18 will be directed by the vehicle control module 12 based upon the current positions of the throttle control 30 and steering control 24, which are determined based on the values provided by the steering sensor 26 and throttle sensor 28.

However, as discussed above, to accurately determine the position and compensate for sensor inaccuracies, the steering sensor 26 and throttle sensor 28 should be calibrated.

It may be desirable that calibration of the sensors 26, 28 be capable of being performed at various locations. For example, the calibration should be capable of being performed during the initial manufacturing or set-up of the vehicle 50. Calibration could also be conducted at a customer's location or a repair facility, for instance when one of the sensors 26, 28 is replaced.

As such, it is desirable to have a calibration process that can be performed in various locations, and be performed by an unskilled labourer or repair technician who may not be intimately familiar with the details of the vehicle 50.

Figure 4:
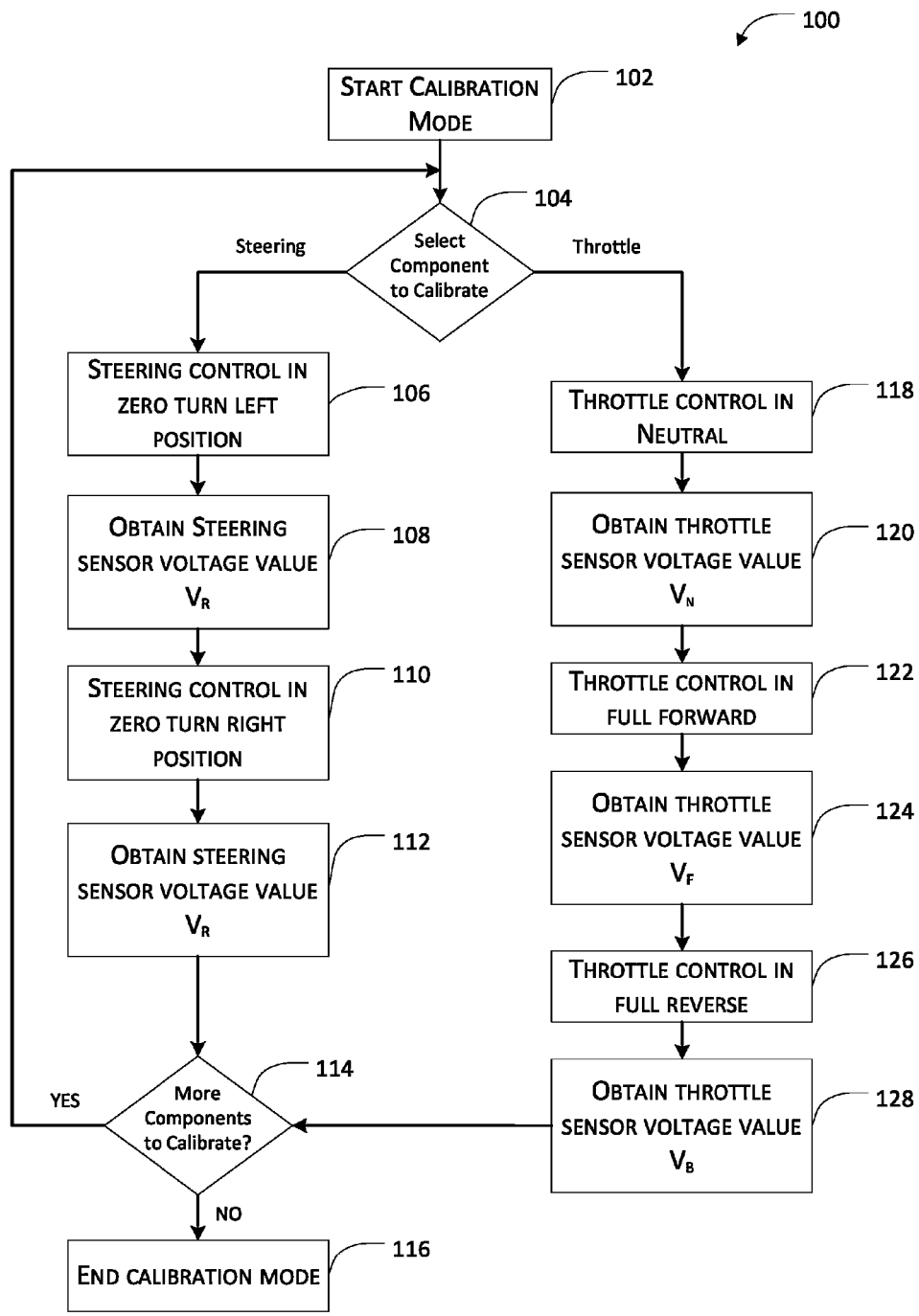
FIG. 4 is a flow chart illustrating a plurality of steps for calibrating a steering sensor and a throttle sensor.

Referring now to FIG. 4, illustrated therein is a flow chart of a method 100 for calibrating the steering sensor 26 and the throttle sensor 28 according to some embodiments. In particular, the vehicle control module 12 may implement the method 100 so that a user (e.g. a technician) may calibrate the sensors 26, 28.

The method 100 begins at step 102 wherein the vehicle control module 12 is placed in a calibration mode. This may be done using an input device on the vehicle 50 (e.g. pressing a button). In some other embodiments, the calibration mode may be entered by using a piece of external equipment, for example by connecting calibration equipment to the vehicle control module 12.

At step 104, a determination may be made as to whether the steering sensor 26 or throttle sensor 28 is being calibrated. If the steering sensor 26 is being calibrated, the method proceeds to step 106. If the throttle sensor 28 is being calibrated, the method proceeds to step 118.

At step 106, the steering control 24 is placed in the zero turn left position (e.g. as shown in FIG. 2C). For example, the user can manually turn the steering control 24 to the zero turn left position. Then, at step 108, the observed steering voltage value $V_L$ from the steering sensor 26 is recorded (e.g. in the data storage device). For example, in the zero turn left position the steering sensor 26 may measure a value of 1.3 volts.

Alternatively, at step 108 in embodiments where the steering sensor 26 is another type of sensor (e.g. an optical sensor) then the corresponding type of sensor reading can be made and recorded.

At step 110, the steering control is placed in the zero turn right position (e.g. as shown in FIG. 2E). For example, the user can manually turn the steering control 24 to the zero turn right position. Then, at step 112, the observed steering voltage value $V_R$ from the steering sensor 26 is recorded (e.g. in the data storage device). For example, in the zero turn right position the steering sensor 26 may observe a value of 2.9 volts.

These two values ($V_R$ and $V_L$) represent the observed outer bounds of the sensor reading from the steering sensor 26 in the zero turn right and zero turn left positions, respectively. Thus, when the current voltage value $V_x$ from steering sensor 26 is subsequently observed by the control module 12 having a value between these two values $V_R$ and $V_L$, some type of interpolation (e.g. linear interpolation) can be used to estimate the actual steering angle for the steering control 24. For example, when $V_R$ is equal to 2.9 volts and $V_L$ is equal to 1.3 volts, an observed steering sensor 26 voltage $V_x$ of 2.1 volts indicates that the steering control 24 is generally straight (e.g. as shown in FIG. 2A).

In some embodiments, other methods of calculating the current position of the steering control 24 based on current value of the steering sensor 26 may be used (e.g. using non-linear interpolation for a non-linear sensor 26).

After step 110, the calibration process for the steering sensor 26 is complete and the method proceeds to step 114, where it is determined whether other components are going to be calibrated. If no additional calibration is to be performed, the method proceeds to step 116 in which the control module 12 exits the calibration mode.

However, returning back to step 104, if the throttle control 30 is to be calibrated, the method 100 proceeds to step 118 and a similar procedure for calibrating the throttle control 30 is performed. In particular, the throttle control 30 is placed in the neutral position at step 118, and a voltage value $V_N$ is obtained from the throttle sensor 28 is recorded at step 120.

At step 122, the throttle control 30 is placed in the full forward position. A throttle voltage value $V_F$ is then obtained from the throttle sensor 28 and recorded at step 124.

Similarly, at step 126, the throttle control 30 is placed in the full reverse position, and then a throttle voltage value $V_B$ is obtained from the throttle sensor 28 and recorded at step 128.

The calibration process for the throttle control 30 and the throttle sensor 28 is complete after step 128 and the method proceeds to step 114.

Similar to the procedure for the steering sensor 26, the control module 12 is configured to determine a current position of the throttle control 30 by comparing a current voltage value $V_T$ received from the throttle sensor 28 with the various throttle voltage values $V_N$, $V_F$, $V_B$ recorded during the calibration steps 118 to 128.

The calculation of the throttle control 30 position from the current throttle voltage value $V_T$ is similar to calculating the steering control 30 position from the steering voltage value $V_X$ as described above, and may for example use linear interpolation. In some embodiments, other methods of calculating the current position of the throttle control 30 based on current observed voltage $V_T$ of the steering sensor 28 may be used (e.g. non-linear interpolation).

These calibration techniques may provide one or more benefits. In particular, this technique tends to be independent of sensor accuracy and thus can provide for reliable and predictable steering and throttle performance across vehicles even when the accuracy of sensors tends to vary greatly. Moreover, these calibration techniques may allow completely different sensors to be used (and which may provide completely different signal values or voltages to the controller 12), without requiring customized programming for each sensor. Furthermore, the calibration techniques tend to be manageable enough so that they can be done by an unskilled labourer in a manufacturing facility or by a repair technician who may be unfamiliar with the details of the vehicle and/or sensors. In particular, the teachings herein do not require complex math or vehicle dimensional parameters.

Figure 5:
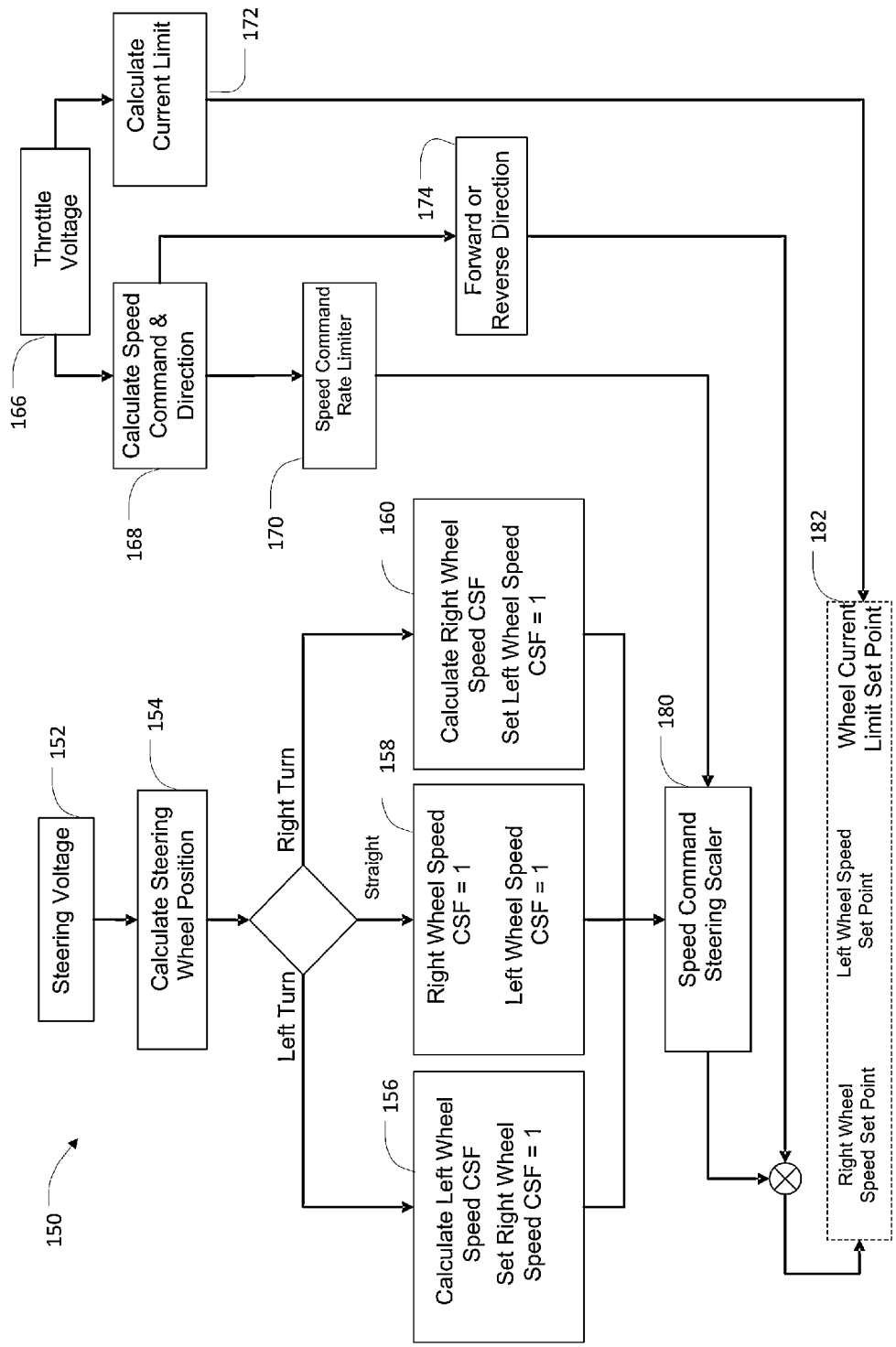
FIG. 5 is a flow chart illustrating a plurality of steps for determining different wheel speeds when turning the vehicle shown in FIG. 1.

Referring now to FIG. 5, illustrated therein is a method 150 for calculating various wheel speeds based on the steering position and the throttle position. Generally, the vehicle control module 12 is configured to execute one or more of the steps 150 based on sensor information determined using the calibration method 100.

In particular, at step 152 a current steering voltage (e.g. $V_X$) is obtained from the steering sensor 26. At step 154, the actual position of the steering control 24 is determined by comparing this voltage $V_X$ with the previously recorded voltages for a zero turn left and zero turn right ($V_L$ and $V_R$). In particular, as described above linear interpolation may be used to estimate the actual current steering angle of the steering control 24.

Based on the position of the steering control 24, the method 150 proceeds to one of the steps 156, 158 or 160. In particular, the method 150 proceeds to step 156 when the steering position indicates that the wheels are in a left turn position, the method 150 proceeds to step 158 when the steering position indicates that the wheels are in the straight position, and the method 150 proceeds to step 160 when the steering position indicates that the wheels are in a right turn position.

At step 156, the method 150 calculates speed command scale factor ($CSF_{LEFT}$) for the left wheel. The command scale factor is a modifying factor that can be multiplied with (or otherwise used to modify) the actual throttle speed (at step 180) to obtain a desired wheel speed for the left wheel 56. For example, in some embodiments the $CSF_{LEFT}$ for the left wheel can be determined according to the following formula:

$$CSF_{LEFT} = 1 - (\emptyset/60) \quad (1)$$

where $\emptyset$ is the angle of the left turn (from zero to 120 degrees). In this embodiment, as the left turn angle increases, the left wheel 56 wheel will slow until at 60 degrees (the pivot left turn position 88) the left wheel 56 will be stopped. As the turn continues past 60 degrees, the left wheel 56 will then be driven rearwards until at 120 degrees the left wheel 56 is reversing at 100% of the throttle input speed.

Conversely, the speed command scale factor $CSF_{RIGHT}$ for the right wheel 58 will be set to 1, so that the right wheel 58 maintains a constant proportional speed during the turn (relative to the throttle input position).

In other embodiments, the speed command scale factors for the left and right wheels 56, 58 may be determined according to different equations and based on other factors. In particular, in some embodiments, the determination of the speed command scale factors for the left and right wheels 56, 58 may depend on the mechanical arrangement of the vehicle components, for example the width of the wheelbase, the vehicle length, the size of the tires, and so on.

At step 158, the method 150 sets the speed command scale factors CSF for both the left and right wheels equal to 1 since the vehicle 50 is going straight. This means that both the left and right driven wheels 56, 58 will equally respond to the throttle control 30 and will generally operate at the same speed.

At step 160 (and similar to step 156), the method 150 calculates a speed command scale factor ($CSF_{RIGHT}$) for the right wheel 58, and sets the $CSF_{LEFT}$ for the left wheel 56 equal to 1. As such, the right wheel 58 will slow as the right turn angle increases, and eventually the right wheel 58 may be operated in the reverse direction.

Turning now to the throttle side of the method 150, at step 166, a current throttle voltage (e.g. $V_T$) is obtained from the throttle sensor 28. At step 168, the position of the throttle control 28 is determined based upon this voltage $V_T$ similar to as described above.

At step 170, the rate of change of the speed command (e.g. the acceleration) is compared against some maximum or threshold value, which could be predetermined. If the rate of change of the speed command exceeds the threshold value, then the requested speed will be reduced accordingly.

In some cases, the maximum acceleration could be asymmetric depending on the direction of travel of the vehicle 50 and whether the vehicle is speeding up or slowing down. For example, the maximum acceleration in the forward direction could be selected so that the vehicle 50 can reach a top speed from a dead stop in approximately 4 seconds, while the maximum deceleration from top speed to a dead stop takes only 1 second.

At step 172, an electrical current limit is determined for the current operating conditions. For example, this could be a maximum available current based on the available charge in a battery, based on safety conditions, or other criteria. In particular, during normal operation the current limit may be 0 amps when the vehicle 50 throttle is in the neutral position, and a maximum current value $I_{max}$ when at full throttle.

In some embodiments, the current limit can be selected between 0 and $I_{max}$ depending on the position of the throttle pedal. For instance, the current limit could scale linearly between the neutral position and $\frac{1}{8}^{th}$ of the full throttle pedal position (and be $I_{max}$ after the $\frac{1}{8}^{th}$ throttle position).

At step 174, a direction (e.g. forward or reverse) is determined.

At step 180, the method 150 combines the speed command scale factors with the requested speed received from step 170. This is combined at step 182 with the directional information from step 174 and with the maximum electrical current determined at step 172.

While the above description provides examples of one or more apparatus, methods, or systems, it will be appreciated that other apparatus, methods, or systems may be within the scope of the present description as interpreted by one of skill in the art.

The invention claimed is:

1. A vehicle control system comprising:
   (a) a steering control coupled to at least one steerable wheel, the steering control having a first position, a second position and a plurality of positions therebetween;
   (b) a steering sensor coupled to the steering control and configured to generate steering sensor signals based upon the position of the steering control;
   (c) a control module coupled to the steering sensor, the control module configured to:
      (i) record a first steering sensor signal value when the steering control is in the first position;
      (ii) record a second steering sensor signal value when the steering control is in the second position; and
      (iii) determine a current position of the steering control by comparing the first and second steering sensor signal values with a current steering sensor signal value.

2. The system of claim 1, further comprising:
   (a) a throttle control having a full forward position, a full reverse position, and a plurality of throttle control positions therebetween; and
   (b) a throttle sensor coupled to the throttle control configured to generate a throttle sensor signal based upon the position of the throttle control;
   (c) wherein the control module is further configured to:
      (i) record a first throttle sensor voltage value when the throttle control is in the full forward position;
      (ii) record a second throttle sensor signal when the throttle control is in the full reverse position; and
      (iii) determine the position of the throttle control by comparing the first and second throttle sensor signals with a current throttle sensor signal value.

3. The system of claim 2, wherein the plurality of throttle control positions includes a neutral position, and wherein the control module is adapted to:
   (a) record a third throttle sensor signal value when the throttle control is in the neutral position; and
   (b) determine the position of the throttle control by comparing the first, second and third throttle sensor signals with the current throttle sensor signal value.

4. The system of claim 2 wherein the throttle sensor is an electro-mechanical sensor adapted to produce a voltage based upon the position of a mechanical component.

5. The system of claim 1 wherein the steering sensor is an electro-mechanical sensor adapted to produce a voltage signal based upon the position of a mechanical component.

6. The system of claim 1, wherein the control module is adapted to determine at least one speed command scale factor for at least one wheel during a turn.

7. The system of claim 6, wherein the control module is adapted to slow at least one wheel relative to another wheel based on the speed command scale factor during the turn.

8. The system of claim 6, wherein the control module is adapted to reverse the direction of at least one wheel relative to another wheel based upon the speed command scale factor.

9. The system of claim 1, wherein the first position is a zero turn left and the second position is a zero turn right.

10. The system of claim 1, further comprising at least one drive motor adapted to be driven in a forward and reverse direction, and being adapted for regenerative braking.

11. The system of claim 10, wherein the at least one drive motor is adapted for regenerative braking in both the forward and reverse directions.

12. A vehicle control method comprising:
   (a) recording a first steering sensor signal value when a steering control is in a first position;
   (b) recording a second steering sensor signal value when the steering control is in a second position; and
   (c) determining a current position of the steering control by comparing the first and second steering sensor signal values with a current steering sensor signal value.

13. The method of claim 12, further comprising:
   (a) recording a first throttle sensor voltage value when a throttle control is in a full forward position;
   (b) recording a second throttle sensor signal when the throttle control is in a full reverse position; and
   (c) determining a position of the throttle control by comparing the first and second throttle sensor signals with a current throttle sensor signal value.

14. The method of claim 13, wherein the plurality of throttle control positions includes a neutral position, and wherein the method further comprises:
   (a) recording a third throttle sensor signal value when the throttle control is in the neutral position; and
   (b) determining the position of the throttle control by comparing the first, second and third throttle sensor signals with the current throttle sensor signal value.

15. The method of claim 13 wherein the throttle sensor signal values are voltage signals received from an electro-mechanical throttle sensor.

16. The method of claim 13, further comprising driving at least one drive motor in a forward and reverse direction, the at least one drive motor being adapted for regenerative braking.

17. The method of claim 16, wherein the at least one drive motor is adapted for regenerative braking in both the forward and reverse directions.

18. The method of claim 12 wherein the steering sensor signal values are voltage signals received from an electro-mechanical steering sensor.

19. The method of claim 12 further comprising determining at least one speed command scale factor for at least one wheel during a turn.

20. The method of claim 19, further comprising slowing at least one wheel relative to another wheel based on the speed command scale factor during the turn.

21. The method of claim 19, further comprising reversing the direction of at least one wheel relative to another wheel based upon the speed command scale factor.

22. The method of claim 12 wherein the first position is a zero turn left and the second position is a zero turn right.

* * * * *